United States Patent
Saito et al.

(10) Patent No.: US 8,415,919 B2
(45) Date of Patent: Apr. 9, 2013

(54) PARKING AND POWER CHARGING SYSTEM

(75) Inventors: Tomohiro Saito, Chiryu (JP); Hiroshi Okada, Kariya (JP); Tomonori Imamura, Nagoya (JP); Hiroyuki Usami, Kariya (JP); Shinichirou Koshimoto, Kariya (JP); Tetsuya Nagata, Konan (JP)

(73) Assignee: DENSO CORPORATION, Kariya (JP)

( * ) Notice: Subject to any disclaimer, the term of this patent is extended or adjusted under 35 U.S.C. 154(b) by 338 days.

(21) Appl. No.: 12/952,752

(22) Filed: Nov. 23, 2010

(65) Prior Publication Data

US 2011/0127944 A1 Jun. 2, 2011

(30) Foreign Application Priority Data

Nov. 30, 2009 (JP) ................................. 2009-271369

(51) Int. Cl.
*H02J 7/00* (2006.01)
*G01N 31/00* (2006.01)
*B60K 1/00* (2006.01)

(52) U.S. Cl.
USPC ............................. 320/109; 701/22; 180/65.1

(58) Field of Classification Search .................. 320/109; 701/22; 180/65.1, 65.21, 65.29; 903/903, 903/907
See application file for complete search history.

(56) References Cited

U.S. PATENT DOCUMENTS

| | | | |
|---|---|---|---|
| 2010/0179893 A1* | 7/2010 | Burke et al. | 705/31 |
| 2010/0191585 A1* | 7/2010 | Smith | 705/13 |
| 2011/0140656 A1* | 6/2011 | Starr et al. | 320/109 |
| 2011/0227531 A1* | 9/2011 | Rajakaruna | 320/109 |
| 2012/0169283 A1* | 7/2012 | Lowenthal et al. | 320/109 |
| 2012/0181985 A1* | 7/2012 | Lowenthal et al. | 320/109 |
| 2012/0181986 A1* | 7/2012 | Lowenthal et al. | 320/109 |

FOREIGN PATENT DOCUMENTS

| | | |
|---|---|---|
| JP | A-H08-111908 | 4/1996 |
| JP | A-2000-209707 | 7/2000 |
| JP | A-2004-229355 | 8/2004 |
| JP | A-2009-042095 | 2/2009 |
| WO | WO 2010/119508 | 10/2010 |

OTHER PUBLICATIONS

Office Action mailed Jan. 31, 2012 issued in corresponding JP patent application No. 2009-271369 (English translation attached).

* cited by examiner

*Primary Examiner* — Richard V Muralidar
(74) *Attorney, Agent, or Firm* — Posz Law Group, PLC

(57) ABSTRACT

When an arriving electric vehicle arrives at a car park with parking spaces, a parking state detection means in a parking and power charging system detects the presence of empty parking spaces. An assignment means assigns a ranking of charging performance to each detected empty parking space so that the empty parking space having the charging device of a higher charging performance has a higher ranking of charging performance on the basis of descending order of charging performance of the charging devices. A communication means obtains vehicle parameters of the arriving electric vehicle. A parking space instruction means instructs the arriving electric vehicle to move to and be parked in the empty parking space having the ranking of charging performance selected on the basis of the vehicle parameter such as necessity to charge or degree to easily charge the on-vehicle battery mounted on the arriving electric vehicle.

8 Claims, 2 Drawing Sheets

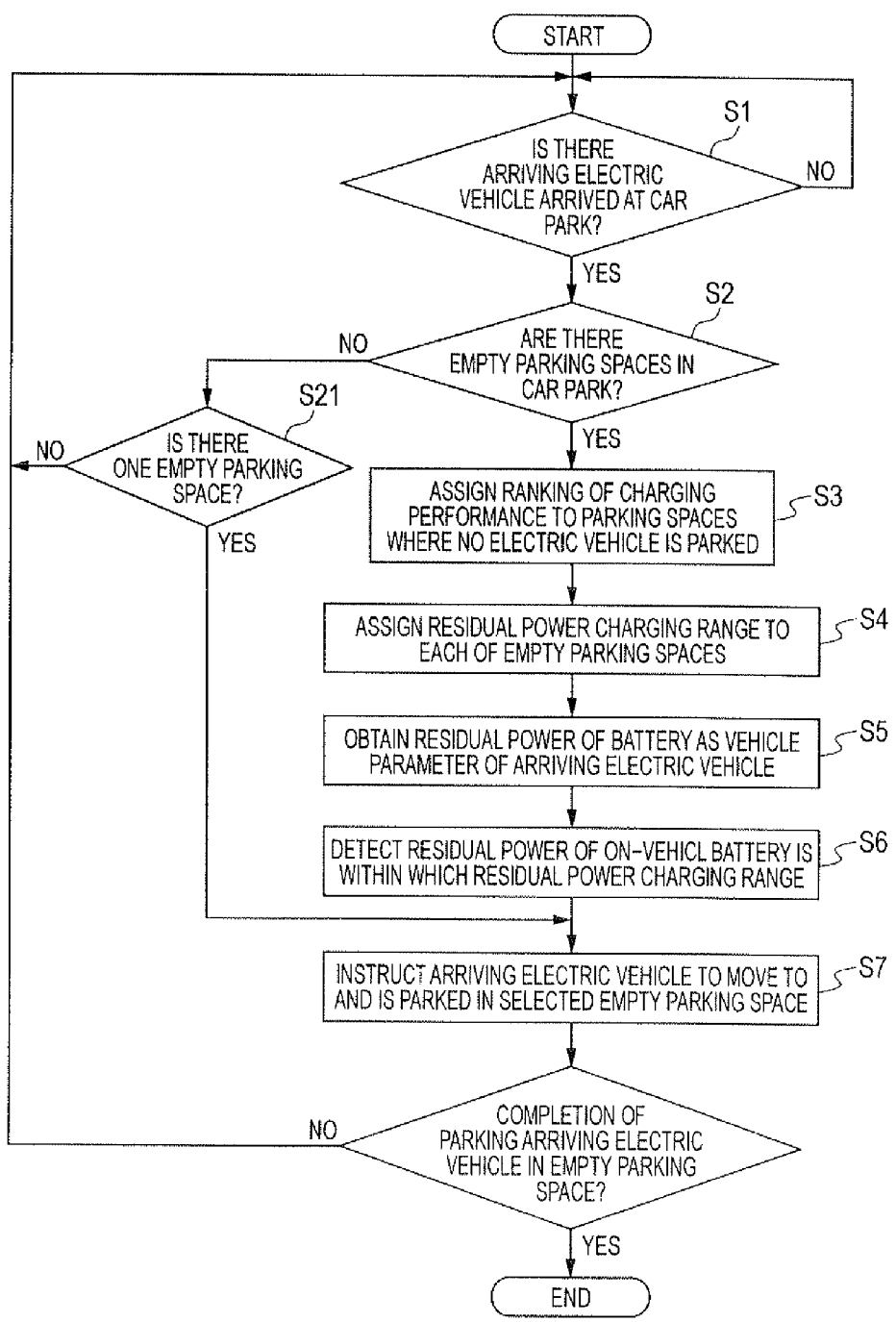

PARKING AND POWER CHARGING SYSTEM

CROSS-REFERENCE TO RELATED APPLICATION

This application is related to and claims priority from Japanese Patent Application No. 2009-271369 filed on Nov. 30, 2009, the contents of which are hereby incorporated by reference.

BACKGROUND OF THE INVENTION

1. Field of the Invention

The present invention relates to a parking and power charging system placed in a car park having a plurality of parking spaces with charging devices capable of charging batteries mounted on electric vehicles parked in the parking spaces.

2. Description of the Related Art

There is a car park with a plurality of parking spaces, each of the parking spaces is equipped with a charging device to charge the battery mounted on the parked electric vehicle. The charging devices are electrically connected to a grid power (such as a commercial power) or an off-grid power. Electric vehicles and hybrid vehicles equipped with a drive motor and an on-vehicle battery parked in the parking spaces in the car park are electrically charged by the charging devices.

In general, the electric vehicles and hybrid vehicles to be parked in the parking spaces in the car park are grouped to a company car group, a rent car group, and a resident car group, for example. The vehicles in the company car group are used only by company workers. The vehicles in the rent car group are commercially lent. The vehicles in the resident car group are used by apartment residents.

For example, Japanese patent document No. JP 3901100 discloses an automatic power charging system for charging batteries mounted on electric vehicles and/or hybrid vehicles which are parked in the parking spaces of a car park. The automatic power charging system has a control means and a plurality of charging devices. The control means in the automatic power charging system detects a residual power (or the state of charge: SOC) of the on-vehicle battery mounted on the electric vehicle, and selects, from a plurality of charging levels having a different power level and charging time, an optimum charging level of the electric vehicle on the basis of the detected residual power of the on-vehicle battery mounted on the electric vehicle. The control means in the automatic power charging system then controls the charging device in order to charge the on-vehicle battery of the electric vehicle to the optimum charging level. By the way, the automatic power charging system having the control means described above is designed so that the total sum of the charging power of the charging devices to charge the batteries of the parked electric vehicles which are currently charged not exceed the maximum power capacity of the electric power device in the automatic power charging system.

This configuration of the automatic power charging system makes it possible for the control means to easily control each of the charging devices and to perform the charging operation with high efficiency.

However, in the automatic power charging system disclosed in the Japanese patent document No. JP3901100, the control means selects the charging level of each of the charging devices according to the state of charge (SOC) of the on-vehicle battery, and changes the charging level of the charging device. Further, such a conventional automatic power charging system of a car park supposes that the electric vehicles are always parked at the corresponding same parking spaces. Accordingly, this structure of the conventional automatic power charging system requires each of the charging devices to haves charging performance (such as charging current) capable of charging the maximum charging capacity. Still further, it is difficult or not designed for the conventional automatic power charging system to use charging devices of a different charging performance, and not designed to decrease the capacity of each of the charging devices.

SUMMARY OF THE INVENTION

It is an object of the present invention to provide a parking and power charging system placed in a car park equipped with an electric power source and various types of charging devices having a different charging performance. The structure of the parking and power charging system according to the present invention allows for the capacity of an electric power source electrically connected to the charging devices to be efficiently decreased. The parking and power charging system according to the present invention can use the parking spaces equipped with various types of charging devices of a different charging performance in order to charge the batteries mounted on the electric vehicles parked in the parking spaces of the car park with high efficiency.

To achieve the above purposes, the present invention provides a parking and power charging system for a car park. The car park has a plurality of parking spaces where electric vehicles are parked. Each of the parking spaces is equipped with a charging device. The parking and power charging system has a parking state detection means, an assignment means, a communication means, and a parking space instruction means. Electric vehicles are parked in the parking spaces in the car park. The charging device mounted on each of the parking spaces of the car park has a different charging performance. It is also possible for some of the charging devices to have the same charging performance.

The parking state detection means is configured to detect whether or not an electric vehicle is parked in each of the parking spaces every time an arriving electric vehicle arrives at the car park. The parking state detection means thereby obtains information on the presence of empty parking spaces in which no electric vehicle is now parked.

The assignment means is configured to assign a ranking of charging performance to each of the empty parking spaces detected by the parking state detection means so that the empty parking space having a higher charging performance has a higher ranking of charging performance on the basis of descending order of charging performance of the charging devices.

The communication means is configured to communicate with an on-vehicle communication unit mounted on the arriving electric vehicle in order to obtain vehicle parameters stored in the arriving electric vehicle every time the arriving electric vehicle arrives at the car park.

The parking space instruction means is configured to select one of the empty parking spaces using the ranking of charging performance assigned by the assignment means, according to the vehicle parameters which indicate residual power of the on-vehicle battery of the arriving electric vehicle, necessity to charge the on-vehicle battery of the arriving electric vehicle, charging capacity of the on-vehicle battery of the arriving electric vehicle, and a degree of how easily and rapidly the on-vehicle battery of the arriving electric vehicle can be charged. The parking space instruction means is further configured to instruct the arriving electric vehicle to move to and to be parked in the selected empty parking space.

The parking and power charging system according to the present invention is capable of selecting one of the empty parking spaces (where no electric vehicle is parked) having a different charging performance every time the arriving electric vehicle arrives at the car park. The parking and power charging system instructs the arriving electric vehicle to move to and is parked in the selected parking space in order to charge the on-vehicle battery mounted on the arriving electric vehicle with high efficiency by the charging device mounted on the selected parking space.

More specifically, the parking and power charging system according to the present invention is equipped with the parking state detection means, the assignment means, the communication means, and the parking space instruction means. When there are one or more empty parking spaces (where no electric vehicle is parked), the parking and power charging system instructs the arriving electric vehicle to move to and be parked in the selected empty parking space as described later.

In the parking and power charging system according to the present invention, the parking state detection means, the assignment means, the communication means, and the parking space instruction means are realized by a management computer equipped with a microcomputer and peripheral devices. The management computer with the microcomputer serves as the parking state detection means, the assignment means, the communication means, and the parking space instruction means.

Further, each of the electric vehicles and the arriving electric vehicle is equipped with an on-vehicle communication unit which communicates with the communication means in the parking and power charging system.

It is not necessary for each of the charging devices in the parking spaces in the parking and power charging system to have a different charging performance. That is, it is possible for some of the charging devices in the parking spaces to have the same charging performance.

In addition, each of the electric vehicles including the arriving electric vehicle has various types of vehicle parameters which indicate the necessity to charge the on-vehicle battery mounted on the electric vehicle, the charging capacity of the on-vehicle battery, and/or the degree to easily charge the on-vehicle battery, etc.

For example, during daytime a plurality of the electric vehicles usually departs from the car park. Each of the electric vehicles is then irregularly returned back to the car park. Every time this arriving electric vehicle is returned back to and arrived at the car park, the parking space detection means detects the presence of empty parking spaces in the car park. That is, the parking space detection means detects whether or not each of the parking spaces is empty (where no electric vehicle is parked) every time the arriving electric vehicle arrives at the car park. The parking state detection means obtains the information regarding the presence of one or more the empty parking spaces in the car park.

The assignment means then assigns a ranking of charging performance to each of the detected empty parking spaces so that the empty parking space with a higher charging performance has a higher ranking of charging performance such as the first ranking, the second ranking, the third ranking, etc. on the basis of descending order of charging performance of the charging devices.

The communication means obtains the vehicle parameters of the arriving electric vehicle every time the arriving electric vehicle arrives at the car park.

The parking space instruction means instructs the arriving electric vehicle to move to and be parked in the empty parking space with the charging device having the optimum ranking of charging performance on the basis of the vehicle parameters obtained by the communication means. For example, the vehicle parameters indicate the residual power of the on-vehicle battery, the necessity to charge the on-vehicle battery, the charging capacity of the on-vehicle battery, and/or the degree to easily charge the on-vehicle battery.

More specifically, the parking space instruction means instructs the arriving electric vehicle to move to and be parked in the selected empty parking space so that the arriving electric vehicle having a higher necessity to charge the on-vehicle battery, a higher charging capacity of the on-vehicle battery, and/or a higher degree to easily charge the on-vehicle battery can be charged by the charging device mounted on the selected parking space having a higher ranking of charging performance. This makes it possible for the parking space instruction means to instruct the arriving electric vehicle to move to and be parked in the selected parking space equipped with the charging device having an optimum charging performance on the basis of the vehicle parameters such as the necessity to charge the on-vehicle battery, the charging capacity of the on-vehicle battery, and/or the degree to easily charge the on-vehicle battery of the arriving electric vehicle.

This structure of the parking state detection means according to the present invention makes it possible for each of the charging devices mounted on the parking spaces to have the maximum charging performance (such as the maximum charging current), and to decrease the total maximum capacity of the power source to which the charging devices of the parking spaces are electrically connected.

Still further, this structure of the parking state detection means according to the present invention makes it possible to use each of the charging devices with its maximum performance.

According to the parking state detection means of the present invention, because the charging devices of the parking spaces have a different charging performance, it is possible to decrease the total maximum capacity of the power source capable of supplying electric power to the charging devices mounted on the parking spaces. It is therefore possible for the on-vehicle battery mounted on the electric vehicles parked in the parking spaces to be charged by the optimum charging device.

BRIEF DESCRIPTION OF THE DRAWINGS

A preferred, non-limiting embodiment of the present invention will be described by way of example with reference to the accompanying drawings, in which:

FIG. 2 is a flow chart showing the operation of the parking and power charging system shown in FIG. 1 according to the embodiments of the present invention.

DETAILED DESCRIPTION OF THE PREFERRED EMBODIMENTS

Figure 1:
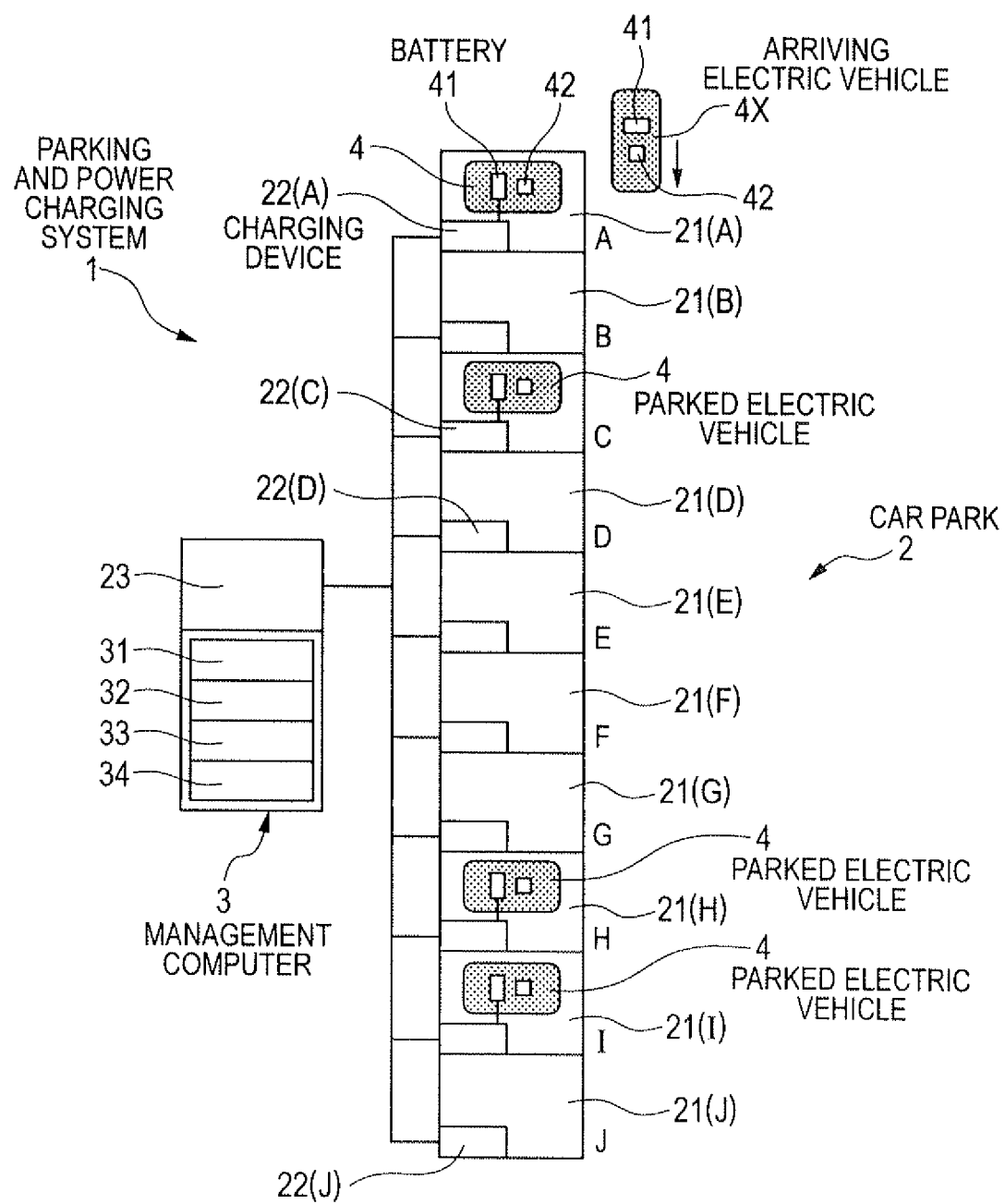
FIG. 1 is a view showing a schematic structure of a parking and power charging system placed in a car park according to embodiments of the present invention.

Hereinafter, various embodiments of the present invention will be described with reference to the accompanying drawings. In the following description of the various embodiments, like reference characters or numerals designate like or equivalent component parts throughout the diagrams.

First Embodiment

A description will be given of the structure and operation of the parking and power charging system 1 placed in a car park according to the first embodiment of the present invention with reference to FIG. 1 and FIG. 2.

FIG. 1 is a view showing a schematic structure of the parking and power charging system 1 placed in a car park according to an embodiment of the present invention.

As shown in FIG. 1, the parking and power charging system according to the embodiment have a car park 2. The car park 2 has a plurality of parking spaces 21. Each of the parking spaces 21 is equipped with a charging device 22. The charging device 22 electrically charges the on-vehicle battery 41 mounted on the electric vehicle 4 parked in the parking space 21 of the car park 2. In particular, each of the charging devices 22 has a different charging performance. It is also possible for some charging devices 22 to have the same charging performance.

The parking and power charging system 1 is equipped with a management computer 3 comprised of a parking state detection means 31, an assignment means 32, a communication means 33, and a parking space instruction means 34.

The parking state detection means 31 detects the presence of empty parking spaces 21X in the car park 2. That is, the parking state detection means 31 detects whether or not an electric vehicle 4 is parked in each of the parking spaces 21 every time the arriving electric vehicle 4X arrives at the car park 2.

Further, the assignment means 32 assigns a ranking of charging performance to each of the detected empty parking spaces 21X so that the empty parking space 21X with a higher charging performance has a higher ranking of charging performance such as the first ranking, the second ranking, the third ranking, . . . on the basis of descending order of charging performance of the charging devices.

The communication means 33 communicates with the on-vehicle communication unit 42 mounted on the arriving electric vehicle 4X in order to obtain vehicle parameters of the arriving electric vehicle 4X. That is, it is designed for the communication means 33 to obtain the vehicle parameters of the arriving electric vehicle 4X every time the arriving electric vehicle 4X has just reached the car park 2.

On the basis of the degree of case of necessity of charging or the degree of case of charging the on-vehicle battery with electric power indicated by the vehicle parameters of the arriving electric vehicle 4X detected by the communication means 33, the parking space instruction means 34 instructs the arriving electric vehicle 4X to move to and be parked in one optimum parking space selected from the detected parking spaces 21X to which the assignment means 32 assigns the ranking of charging performance.

A description will now be given of the parking and power charging system 1 for a car park according to the first embodiment of the present invention with reference to FIG. 1 and FIG. 2.

As shown in FIG. 1, the electric vehicles 4 including the arriving electric vehicle 4X are electric vehicles or hybrid vehicles equipped with a driving electric motor. Each of the electric vehicles 4 and 4X has an outlet with which each of the charging devices 22 in the parking and power charging system 1 is electrically connected in order to charge the on-vehicle battery by electric power supplied from a power source 23.

A plurality of the charging devices 22 in the car park 2 has a different charging performance. This configuration of the charging devices 22 decreases the total charging capacity which is necessary for the power source 23 (special power source or a grid power such as a commercial power).

The parking and power charging system 1 according to the first embodiment can be applied to various cases such as the case where electric vehicles used in business of a company are parked, the case where electric vehicles to be lent to persons are parked, and the case where electric vehicles which are shared in residents in an apartment house are parked.

As shown in FIG. 1, the parking and power charging system placed in the car park 2 is equipped with the management computer 3 which controls the parking state detection means 31, the assignment means 32, the communication means 33, and the parking space instruction means 34. The management computer 3 also manages the car park 2. Each of the electric vehicles 4 and 4X is equipped with the on-vehicle communication device 42. The vehicle 4 or 4X communicates with the communication means 33 in the management computer 3 through the on-vehicle communication unit 42.

Further, it is not necessary for all of the charging devices 22 to have a different charging performance. For example, it is acceptable for some of the charging devices 22 to have the same charging performance.

Still further, various parameters of the vehicle (hereinafter, referred to as the "vehicle parameters") are set in each of the electric vehicles 4, 4X. For example, the vehicle parameters indicate (a1) necessity to charge the on-vehicle battery, (a2) charging capacity of the on-vehicle battery, and (a3) the degree of case of charging the on-vehicle battery with electric power.

In the parking and power charging system 1 according to the first embodiment uses one of the vehicle parameters, which regards to the residual power (or state of charge (SOC)) of the on-vehicle battery 41 of the electric vehicle 4, 4X. For example, the electric vehicle 4, 4X detects the residual power of the on-vehicle battery 41 through a battery sensor (not shown) and stores the data regarding the detected residual power as the vehicle parameter into a memory in the management computer 3 in an electric control unit (ECU, not shown), for example.

The communication means 33 in the management computer 3 in the parking and power charging system 1 communicates with the on-vehicle communication unit 42 of the electric vehicle 4, 4X through a wireless LAN (local area network), a car navigation system, a communication network (internet), or an information center.

The parking state detection means 31 detects whether or not an electric vehicle 4 is parked in each of the parking spaces 21, 21X through a parking sensor. The parking sensor transferred the detected information to the parking state detection means 31 in the management computer 3.

The parking state detection means 31 recognizes the empty parking spaces 21X where no electric vehicle is parked and also recognizes the parking spaces 21 where the electric vehicles have been already parked.

When receiving the information regarding the presence of the empty parking spaces 21X transferred from the parking state detection means 31, the assignment means 32 assigns a ranking of charging performance to each of the empty parking spaces 21X so that the empty parking space 21X equipped with the charging device 22 with a higher charging performance has a higher ranking of charging performance.

In the first embodiment, the assignment means 32 assigns a residual power charging range to each of the empty parking spaces 21X having the ranking of charging performance so that the empty parking space having a higher ranking of charging performance has a lower residual power charging range on the basis of descending order of charging performance of the charging devices mounted on the detected empty parking spaces. (see Table 1 described later.) That is, the residual power charging range indicates a range of residual power of the on-vehicle battery. The more the ranking of charging performance assigned to the empty parking space is increased, the more the residual power charging range assigned to the empty parking space is decreased.

The parking space instruction means 34 detects that the residual power of the on-vehicle battery 41 mounted on the arriving electric vehicle 4X is present to which residual power charging range assign to the empty parking space.

The parking space instruction means 34 then instructs the arriving electric vehicle 4X to move to and be parked in the selected parking space 21X having the optimum residual power charging range in which the residual power of the on-vehicle battery 41 mounted on the arriving electric vehicle 4X is present.

The management computer 3 in the parking and power charging system 1 assigns the residual power charging range to the empty parking spaces 21X every arrival of the electric vehicle 4X at the car park 2, and the parking space instruction means 34 instructs the arriving electric vehicle 4X to move to and be parked in the optimum parking spaces.

The parking and power charging system 1 according to the first embodiment is capable of dynamically switching to, namely, selecting the optimum empty parking space 21X in order to park the arriving electric vehicle 4X and charge the on-vehicle battery of the arriving electric vehicle 4X with high efficiency on the basis of one or more of the vehicle parameters of the arriving electric vehicle 4X every time the arriving electric vehicle 4A arrives at the car park 2. The parking spaces 21, 21X in the car park 2 are equipped with the charging devices of a different charging performance.

In other words, the parking and power charging system 1 according to the first embodiment selects one of the empty parking spaces equipped with the charging devices 22 of a different charging performance in order to perform the most suitable charging of the on-vehicle battery mounted on the arriving electric vehicle.

Specifically, the parking and power charging system 1 according to the first embodiment is equipped with the management computer 3. The management computer 3 is comprised of the parking state detection means 31, the communication means 33, the assignment means 32, and the parking space instruction means 34.

The parking and power charging system 1 according to the first embodiment selects the optimum empty parking space 21X from the optimum empty parking spaces 21X every time the arriving electric vehicle 4X has just arrived (gone back to) at the car park 2. The parking and power charging system 1 according to the first embodiment then instructs the arriving electric vehicle 4X to move to and be parked in the selected optimum parking space 21X by the following process.

Next, a description will now be given of the operation of the parking and power charging system 1 according to the first embodiment with reference to FIG. 2.

FIG. 2 is a flow chart showing the operation of the parking and power charging system 1 shown in FIG. 1 according to the embodiment of the present invention.

In general, one or more electric vehicles 4 leaves from the car park 2 for various reasons such as business or for shopping during the daytime, and then return to the car park 2.

The parking state detection means 31 detects whether or not an arriving electric vehicle arrives at the car park 2 (step S1).

The parking state detection means 31 detects the presence of empty parking spaces 21X in the car park 2 every time the arriving electric vehicle 4X arrives at the car park 2 (step S2).

When the detection result in step S2 indicates that the car park 2 has at least two empty parking spaces 21X ("Yes" in step S2), the operation flow goes to step S3.

By the way, when the detection result in step S2 indicates that there is one empty parking space 21X only or no empty parking space 21X ("No" in step S2), the operation flow goes to step S21.

In step S21, when there is one empty parking space 21X only ("Yes" in step S21), the operation flow goes to step S7. In step 7, the parking state detection means 31 instructs the arriving electric vehicle 4X to move to and be parked in the detected empty parking space 21X.

In step S21, when there is no empty parking space 21X ("No" in step S21), the operation flow is returned to step S1.

On the other hand, when the detection result indicates that the car park 2 has two or more empty parking spaces 21X ("Yes" in step S2), the assignment means 32 assigns a ranking of charging performance to each of the detected empty parking spaces 21X so that the empty parking space 21X equipped with the charging device 22 with a higher charging performance has a higher ranking of charging performance on the basis of descending order of charging performance of the charging devices. (step S3)

Further, the assignment means 32 assigns a residual power charging range to each of the empty parking spaces 21X having the ranking of charging performance so that the empty parking space having a higher ranking of charging performance has a lower residual power charging range on the basis of descending order of charging performance of the charging devices. (step S4)

The communication means 33 obtains the residual power of the on-vehicle battery 41 as the vehicle parameter of the arriving electric vehicle 4X every time the arriving electric vehicle 4X arrives at the car park 2 (step S5).

The parking space instruction means 34 then detects that the residual power of the on-vehicle battery 41 mounted on the arriving electric vehicle 4X is present within which residual power charging range (step S6), and instructs the arriving electric vehicle 4X to move to and be parked in the parking space 21X having the detected residual power charging ranking (step S7).

In more detail, the parking and power charging system 1 according to the first embodiment instructs the arriving electric vehicle 4X to move to and be parked in the selected empty parking space by the following procedure.

As shown in FIG. 1, the car park 2 has the ten parking spaces 21X (A to J), each of which is equipped with the charging device 22 (A to J).

In particular, the parking spaces 21X(A) and 21X(B) equipped with the charging devices 22(A) and 22(B), respectively, have the maximum charging performance (charging capacity). A pair of the parking spaces 21X(C) and 21X(D) has a next-ranked charging performance. A pair of the parking spaces 21X(E) and 21X(F) has a next-ranked charging performance. A pair of the parking spaces 21X(G) and 21X(H) has a next-ranked charging performance. Finally, a pair of the parking spaces 21X(I) and 21X(J) has a next-ranked charging performance. Thus, the parking spaces 21X(I) and 21X(J) equipped with the charging devices 22(I) and 22(J) have the lowest-ranked charging performance.

When the arriving electric vehicle 4X has just arrived at the car park 2 in the condition of the car park 2 shown in FIG. 1, the parking state detection means 31 in the management computer 3 detects the presence of the empty parking spaces 21X(B), 21X(D) to 21X(G), and 21X(J).

Table 1 shows the state of the residual power charging range determined by the parking and power charging system 1 according to the first embodiment.

The residual power of the on-vehicle battery 41 mounted on the arriving electric vehicle 4X is designated with the mark "x" (see the right-hand column in Table 1).

TABLE 1

| Charging Device No. (Parking space No.) | Charging Performance (kW) | Empty/ Parked | Ranking of Charging Performance | Residual power charging range (%) (x: residual power of on-vehicle battery of arriving electric vehicle) |
|---|---|---|---|---|
| A | 1.5 | PARKED | — | — |
| B | 1.5 | EMPTY | 1 | x < 25 |
| C | 1.25 | PARKED | — | — |
| D | 1.25 | EMPTY | 2 | 25 ≦ x < 40 |
| E | 1 | EMPTY | 3 | 40 ≦ x < 70 |
| F | 1 | EMPTY | 3 | 40 ≦ x < 70 |
| G | 0.75 | EMPTY | 4 | 70 ≦ x < 85 |
| H | 0.75 | PARKED | — | — |
| I | 0.5 | PARKED | — | — |
| J | 0.5 | EMPTY | 5 | 85 ≦ x < 100 |

As shown in Table 1, the assignment means 32 in the management computer 3 assigns the ranking to the empty parking spaces 21X(B), 21X(D), 21X(E), 21X(F), 21X(G), and 21X(J), respectively, where no electric vehicle is parked, so that the parking space 21X(B) has the highest-ranked charging performance, namely the first ranking of charging performance, the parking space 21X(D) has the second ranking of the charging performance, the parking spaces 21X(E) and 21X(F) have the third ranking of charging performance, the parking space 21X(G) has the fourth ranking of charging performance, and the parking space 21X(J) has the lower charging performance, namely the fifth ranking of charging performance.

The assignment means 32 assigns to the empty parking spaces 21X(B), 21X(D), 21X(E), 21X(F), 21X(G), and 21X(J), the residual power charging ranges of x<25(%), 25≦x<40(%), 40≦x<70(%), 40≦x<70(%), 70≦x<85(%), and 85≦x<100(%), respectively.

The communication means 33 in the management computer 3 detects the residual power of the on-vehicle battery 41 mounted on the arriving electric vehicle 4X, and transfers the detection result to the parking space instruction means 34. When receiving the detection result from the communication means 33, the parking space instruction means 34 instructs the arriving electric vehicle 4X to move to and be parked in the empty parking space 21(D) when the on-vehicle battery 41 of the arriving electric vehicle 4X has the residual power of 30%, to the empty parking space 21X(E) or 21X(F) when the on-vehicle battery 41 of the arriving electric vehicle 4X has the residual power of 50%. This makes it possible for the parking space instruction means 34 to instruct the arriving electric vehicle 4X to move to and be parked in the empty parking space 21X with the higher ranking of charging performance, namely having the charging device 22 with a higher charging performance when the on-vehicle battery 41 of the arriving electric vehicle 4X has a higher necessity to charge. Further, the parking space instruction means 34 can instruct the arriving electric vehicles 4X, which irregularly returns to the car park 2, to the parking spaces 21 having the charging device with the optimum charging performance which corresponds to the degree in necessary to charge the on-vehicle battery 41 of the arriving electric vehicles 4X.

Accordingly, it is not necessary for the parking and power charging system according to the first embodiment to have the parking spaces, each of which is equipped with a charging device having the maximum charging performance. This makes it possible to decrease the total electric power of the power source 23 which is electrically connected to the charging devices 22 (A) to 22(J) mounted on the parking spaces 21(A) to 21(J). Still further, the structure of the parking and power charging system 1 can use each of the charging devices 22 (A) to 22(J) on the basis of its charging performance.

According to the parking and power charging system 1 described above in detail, it is possible to decrease the maximum power of the power source 23 electrically connected to all of the charging devices 22(A) to 22(J) having a different charging performance mounted on the parking spaces 21 (A) to 21(J), and to perform the optimum operation to charge the on-vehicle battery 41 of the arriving electric car 4X which has just arrived at the car park 2.

Second Embodiment

A description will be given of the parking and power charging system according to the second embodiment of the present invention.

The parking and power charging system according to the second embodiment is applied to the car park 2 in which the electric vehicle has an on-vehicle alternator capable of generating electric power by nature energy such solar energy and wind force. The generation of electric power can be performed during the parking of the electric vehicle in the car park 2.

In the second embodiment, the communication means 33 is capable of detecting whether or not the arriving electric vehicle 4X is an electric vehicle with an on-vehicle alternator.

When the detection result indicates that the arriving electric vehicle 4X is an electric vehicle with an on-vehicle alternator (for example, an on-vehicle alternator of solar function), the parking space instruction means 34 increases the value which indicates the residual power of the on-vehicle battery 41 mounted on the arriving electric vehicle 4X with the on-vehicle alternator. Further, the parking space instruction means 34 detects the weather condition around the car park 2 every time the arriving electric vehicle 4X arrives at the car park 2. The parking space instruction means 34 adjusts the value by taking into account the power generation function of the on-vehicle alternator in the arriving electric vehicle 4X.

The parking space instruction means 34 increases the value indicating the residual power of the on-vehicle battery 41 mounted on the arriving electric vehicle 4X with the on-vehicle alternator by the following procedure when the arriving electric vehicle 4X is an electric vehicle with an on-vehicle alternator.

The procedure has the same steps until the assignment means 32 assigns the residual power charging range to each of the empty parking spaces 21X where no electric vehicle is parked.

In the second embodiment, the parking space instruction means 34 then detects the residual power of the on-vehicle battery 41 of the arriving electric vehicle 4X with the on-vehicle alternator, and detects the detected residual power of the on-vehicle battery 41 is within which residual power charging range.

The parking space instruction means 34 reads, from the memory in the ECU (not shown), the data regarding the charging performance of the charging device 22 of the parking space 21X which corresponds to the above-detected residual power charging range.

It can be possible to obtain the adjusted residual power A'(%) of the on-vehicle battery 41 by the following formula:

$A'(\%) = A \times (B+C)/B,$ where A indicates a residual power of the on-vehicle battery 41, B designates a charging performance of the charging device 22, and C indicates a power generation performance of the on-vehicle alternator.

For example, in Table 1 previously shown, when the residual power A of the on-vehicle battery 41 mounted on the arriving electric vehicle 4X is 30(%) and the power generation performance C of the on-vehicle alternator is 0.5 (kW), the charging performance B becomes 1.25 (kW), and the adjusted residual power A' becomes 42(%) (=30×(1.25+0.5)/1.25).

Because the adjusted residual power A' of 42(%) is within the residual power charging range of 40≦x<70(%), the parking space instruction means 34 instructs the arriving electric vehicle 4X with the on-vehicle alternator to move to and be parked in the parking space 21X(E) or 21X(F).

As described above, according to the second embodiment of the present invention, when the arriving electric vehicle 4X has an on-vehicle alternator, the parking space instruction means 34 instructs the arriving electric vehicle 4X to move to and be parked in the parking space 21X equipped with the charging device 22 having a lower charging performance because the arriving electric vehicle 4X with the on-vehicle alternator automatically generates the electric power during the parking.

The power generation performance of the on-vehicle alternator varies according to the weather condition such as clear weather, cloudy weather, rain. When it is cloudy or rain, the on-vehicle alternator cannot generate electric power.

The parking space instruction means 34 detects the weather condition when the arriving electric vehicle 4X arrives at the car park 2. The parking space instruction means 34 then decreases the power generation performance of the on-vehicle alternator of the arriving electric vehicle 4X when the detection result indicates that the weather is cloudy or rain. For example, the parking space instruction means 34 can decrease the power generation performance of 0.5 (kW) of the on-vehicle alternator to 0.2 (kW) because of not performing the on-vehicle alternator of solar function when the weather is cloudy or raining.

Still further, the parking space instruction means 34 can adjust the power generation performance of the on-vehicle alternator based on detected data regarding wind force when the on-vehicle alternator has the function to perform wind power generation by using wind force.

The other components of the parking and power charging system according to the second embodiment are the same of those of the parking and power charging system according to the first embodiment. The parking and power charging system according to the second embodiment has the same function and effects of the parking and power charging system according to the first embodiment.

Third Embodiment

A description will be given of the parking and power charging system according to the third embodiment of the present invention.

The parking and power charging system according to the third embodiment uses the maximum charging capacity of the on-vehicle battery 41 or the maximum charging speed of the on-vehicle battery 41 as the vehicle parameter of the arriving electric vehicle 4.

In the parking and power charging system according to the third embodiment, the assignment means 32 in the management computer 3 assigns a residual power maximum charging capacity range to each of the empty parking spaces 21X so that the empty parking space 21X having a higher charging performance has a lower charging capacity maximum range on the basis of descending order of charging performance of the charging devices.

The charging capacity maximum range indicates the range of the maximum charging capacity of the on-vehicle battery 41 mounted on the arriving electric vehicle 4X.

The parking space instruction means 34 detects that the maximum charging capacity of the on-vehicle battery 41 mounted on the arriving electric vehicle 4X is within which charging capacity maximum range.

The parking space instruction means 34 instructs the arriving electric vehicle 4X to move to and to be parked at the empty parking space 21X having the charging capacity maximum range in which the maximum charging capacity of the on-vehicle battery 41 mounted on the arriving electric vehicle 4X is present.

The maximum charging capacity and the maximum charging speed of the on-vehicle battery 41 can be stored into the memory of the ECU (electric control unit) of the electric vehicle 4, 4X as the fixed data items of the on-vehicle battery 41.

When the maximum charging capacity (kWh) of the on-vehicle battery 41 mounted on the electric vehicle 4, 4X is used as the vehicle parameter, the more the charging capacity and the maximum charging capacity of the electric vehicle are increased, the more the charging performance of the empty parking space 21X, to be selected by the parking space instruction means 34, is increased. The parking space instruction means 34 instructs the arriving electric vehicle 4X to move to and be then parked in the selected empty parking space 21X with a higher charging performance. In this case, the residual power charging range shown in Table 1 is replaced with the charging capacity maximum range. The assignment means 32 assigns the charging capacity maximum range to the empty parking spaces 21X so that the empty parking space 21X with a higher charging performance has a lower charging capacity maximum range.

For example, the assignment means 32 assigns the charging capacity maximum range of not less than 7.5 (kWh) to the empty parking space 21X with the first ranking of charging performance, the charging capacity maximum range within not less than 6 (kWh) and less than 7.5 (kWh) to the empty parking space 21X with the second ranking of the charging performance, the charging capacity maximum range within not less than 3 (kWh) and less than 6 (kWh) to the empty parking space 21X with the third ranking of the charging performance, the charging capacity maximum range within not less than 1.5 (kWh) and less than 3 (kWh) to the parking space 21X with the fourth ranking of the charging performance, and the charging capacity maximum range of less than 1.5 (kWh) to the empty parking space 21X with the fifth ranking of the charging performance.

On the other hand, when the maximum charging speed (kWh/h) of the charging capacity of the on-vehicle battery 41 mounted on the electric vehicle 4, 4X is used as the vehicle parameter, the more the charging capacity and the maximum charging speed of the arriving electric vehicle 4A are increased, the more the ranking of charging performance of the charging device 22 in the empty parking space 21X which is selected by the parking space instruction means 34 becomes high.

In this case, it is possible to replace the residual power charging range in Table 1 with the maximum charging speed range.

For example, the assignment means 32 assigns the maximum charging speed range of not less than 7.5 (kW/h) to the empty parking space 21X with the first ranking of charging performance, the maximum charging speed range within not less than 6 (kWh/h) and less than 7.5 (kWh/h) to the empty parking space 21X with the second ranking of charging performance, the maximum charging speed range within not less than 3 (kWh/h) and less than 6 (kWh/h) to the parking space 21X with the third ranking of charging performance, the maximum charging speed range within not less than 1.5 (kWh/h) and less than 3.0 (kWh/h) to the parking space 21X with the fourth ranking of charging performance, and the maximum charging speed range of less than 1.5 (kWh/h) to the parking space 21X with the fifth ranking of charging performance.

The other components of the parking and power charging system according to the third embodiment are the same of those of the parking and power charging system according to the first embodiment. The parking and power charging system according to the third embodiment has the same function and effects of the parking and power charging system according to the first embodiment.

Fourth Embodiment

A description will be given of the parking and power charging system according to the fourth embodiment of the present invention.

The parking and power charging system according to the fourth embodiment adjusts the residual power of the on-vehicle battery 41 mounted on the arriving electric vehicle 4X as the vehicle parameter on the basis of the performance and condition of the on-vehicle battery 41.

The parking space instruction means 34 is configured to adjust the residual power of the on-vehicle battery 41 mounted on the arriving electric vehicle 4X on the basis of one or more following conditions (a) to (i):

(a) the maximum charging capacity of the on-vehicle battery 41;

(b) the maximum charging speed to charge the on-vehicle battery 41;

(c) the temperature of the on-vehicle battery 41;

(d) the internal resistance of the on-vehicle battery 41;

(e) the voltage fluctuation of the on-vehicle battery 41;

(f) the deterioration degree of the on-vehicle battery 41;

(g) the average electric-power consumption rate which indicates the travel distance of the on-vehicle battery 41 per electric power of the on-vehicle battery 41;

(h) the charging period of time counted from the time when the electric vehicle 4, 4X has just parked at the parking space 21X to the time when this parked electric vehicle 4, 4X leaves this parking space; and (i) the predicted travel distance of the electric vehicle 4, 4X which indicates how long (e.g. in kilometers) the electric vehicle 4, 4X parked in the parking space 21X can travel after departing from the parking space 21X.

It is possible to store (a) the maximum charging capacity of the on-vehicle battery 41, (b) the maximum charging speed of the on-vehicle battery 41, (c) the temperature of the on-vehicle battery 41, (d) the internal resistance of the on-vehicle battery 41, the voltage fluctuation of the on-vehicle battery 41, and (g) the average electric-power consumption rate of the on-vehicle battery 41 into the memory of the ECU mounted on the electric vehicle 4, 4X.

Further, it is also possible to calculate (f) the deterioration degree of the on-vehicle battery 41 on the basis of the relationship between the charging power and the residual power of the on-vehicle battery 41 during the process to use the on-vehicle battery 41.

Still further, it is possible to calculate (h) the charging period of time and (i) the predicted travel distance of the electric vehicle 4, 4X based on the data transferred from the car navigation system and an information center (not shown), etc.

The parking space instruction means 34 can adjust the residual power of the on-vehicle battery 41 mounted on the arriving electric vehicle 4X so that the arriving electric vehicle 4X with a higher maximum charging capacity of the on-vehicle battery 41 has a more decreased residual power of the on-vehicle battery 41.

Further, the parking space instruction means 34 can adjust the residual power of the on-vehicle battery 41 mounted on the arriving electric vehicle 4X so that the arriving electric vehicle 4X with a lower maximum charging speed of the on-vehicle battery 41 has a more decreased (or more lower) residual power of the on-vehicle battery 41.

Still further, the parking space instruction means 34 can adjust the residual power of the on-vehicle battery 41 mounted on the arriving electric vehicle 4X so that the arriving electric vehicle 4X having a higher or lower temperature higher or lower than an optimum temperature range (when the temperature of the on-vehicle battery 41 is out of a proper temperature range) has a more increased residual power of the on-vehicle battery 41.

Still further, the parking space instruction means 34 can adjust the residual power of the on-vehicle battery 41 mounted on the arriving electric vehicle 4X so that the arriving electric vehicle 4X with a lower internal resistance of the on-vehicle battery 41 has a more decreased residual power of the on-vehicle battery 41.

Still further, the parking space instruction means 34 can adjust the residual power of the on-vehicle battery 41 mounted on the arriving electric vehicle 4X so that the arriving electric vehicle 4X with a smaller voltage fluctuation has a more decreased residual power of the on-vehicle battery 41.

Still further, the parking space instruction means 34 can adjust the residual power of the on-vehicle battery 41 mounted on the arriving electric vehicle 4X so that the arriving electric vehicle 4X with a lower deterioration of the on-vehicle battery 41 has a more decreased residual power of the on-vehicle battery 41.

Still further, the parking space instruction means 34 can adjust the residual power of the on-vehicle battery 41 mounted on the arriving electric vehicle 4X so that the arriving electric vehicle 4X with a lower average electric-power consumption rate of the on-vehicle battery 41 has a more decreased (or lower) residual power of the on-vehicle battery 41. The average electric-power consumption rate indicates the travel distance of the on-vehicle battery 41 per electric power of the on-vehicle battery 41.

Still further, the parking space instruction means 34 can adjust the residual power of the on-vehicle battery 41 mounted on the arriving electric vehicle 4X so that the arriving electric vehicle 4X with a shorter charging period of time of the on-vehicle battery 41 has a more decreased residual power of the on-vehicle battery 41. The charging period of time is counted from the time when the electric vehicle 4, 4X has just parked in the parking space 21X to the time when this parked electric vehicle 4, 4X leaves this parking space. (On the other hand, so that the arriving electric vehicle 4X with a longer charging period of time of the on-vehicle battery 41 has a more decreased (or lower) residual power of the on-vehicle battery 41.)

Still further, the parking space instruction means 34 can adjust the residual power of the on-vehicle battery 41 mounted on the arriving electric vehicle 4X so that the arriving electric vehicle 4X with a longer travel distance has a more decreased (or lower) residual power of the on-vehicle battery 41. The predicted travel distance of the electric vehicle 4, 4X indicates how long (e.g. in kilometers) the electric vehicle 4, 4X parked in the parking space 21X can travel after departing from the parking space 21X.

When decreasing the residual power of the on-vehicle battery 41, the parking space instruction means 34 instructs the arriving electric vehicle 4X to move to and be parked in the empty parking space 21X with a more higher ranking of charging performance (in the empty parking space 21X equipped with the charging device 22 with a more higher charging performance).

When detecting that the arriving electric vehicle is an electric vehicle, the parking space instruction means 34 in the parking and power charging system according to the fourth embodiment adjusts the residual power charging range of the on-vehicle battery 41 mounted on the arriving electric vehicle 4X. The parking and power charging system according to the fourth performs the same steps of that of the first embodiment previously described until the assignment means 32 assigns the residual power charging range to each of the detected empty parking spaces 21X.

The parking space instruction means 34 in the parking and power charging system according to the fourth embodiment then detects the residual power of the on-vehicle battery 41 mounted on the arriving electric vehicle 4X. The parking space instruction means 34 then calculates the adjusted residual power A' of the on-vehicle battery 41 by using the following equation:

$$A' = A \times B \times C \times D \times E \times F \times G \times H \times I \times J,$$

where A is the residual power of the on-vehicle battery 41, B is a coefficient obtained from the range of the maximum charging capacity of the on-vehicle battery 41, C is a coefficient obtained from the range of the maximum charging speed, D is a coefficient obtained from the temperature range of the on-vehicle battery 41, E is a coefficient obtained from the range of the internal resistance of the on-vehicle battery 41, F is a coefficient obtained from a range of the voltage fluctuation of the on-vehicle battery 41, G is a coefficient obtained from the range of the deterioration of the on-vehicle battery 41, H is a coefficient obtained from the average electric-power consumption rate of the on-vehicle battery 41, I is a coefficient obtained from the range of the charging period of time of the on-vehicle battery 41, and J is a coefficient obtained from the predicted driving distance of the arriving electric vehicle 4X.

Following Table 2 shows the above coefficients which are used when the parking space instruction means 34 adjusts the residual power of the on-vehicle battery 41 mounted on the arriving electric vehicle 4X on the basis of the maximum charging capacity of the on-vehicle battery 41, the maximum charging speed of the on-vehicle battery 41, the temperature of the on-vehicle battery 41, and the internal resistance of the on-vehicle battery 41.

Following Table 3 shows the coefficients which are used when the voltage fluctuation of the on-vehicle battery 41, the deterioration of the on-vehicle battery 41, the charging period of time of the on-vehicle battery 41, and the predicted drive distance of the on-vehicle battery 41 are adjusted.

In Table 2 and Table 3, the reference character "x" indicates the parameters such as the maximum charging capacity of the on-vehicle battery 41 mounted on the arriving electric vehicle 4X.

TABLE 2

| Battery of Electric Vehicle | | | | | | | |
|---|---|---|---|---|---|---|---|
| Maximum charging capacity [kWh] | Coefficient | Maximum Charging Speed [kW] | Coefficient | Temperature [° C.] | Coefficient | Internal Resistance [Ω] | Coefficient |
| $x < 1$ | 1.4 | $x < 1$ | 1.4 | $0 \leq x < 42$ | 0.8 | $x < 0.1$ | 0.8 |
| $1 \leq x < 2$ | 1.3 | $1 \leq x < 2$ | 1.3 | $-3 \leq x < 0$, $42 \leq x < 44$ | 0.9 | $0.1 \leq x < 0.2$ | 0.9 |
| $2 \leq x < 3$ | 1.2 | $2 \leq x < 3$ | 1.2 | $-6 \leq x < -3$, $44 \leq x < 46$ | 1 | $0.2 \leq x < 0.3$ | 1 |
| $3 \leq x < 4$ | 1.1 | $3 \leq x < 4$ | 1.1 | $-9 \leq x < -6$, $46 \leq x < 48$ | 1.1 | $0.3 \leq x < 0.4$ | 1.1 |
| $4 \leq x < 5$ | 1 | $4 \leq x < 5$ | 1 | $-12 \leq x < -9$, $48 \leq x < 50$ | 1.2 | $0.4 \leq x < 0.5$ | 1.2 |
| $5 \leq x < 6$ | 0.9 | $5 \leq x < 6$ | 0.9 | $-15 \leq x < -12$, $50 \leq x < 52$ | 1.3 | $0.5 \leq x < 0.6$ | 1.3 |
| $6 \leq x < 7$ | 0.8 | $6 \leq x < 7$ | 0.8 | $-18 \leq x < -15$, $52 \leq x < 54$ | 1.4 | $0.6 \leq x < 0.7$ | 1.4 |
| $7 \leq x < 8$ | 0.7 | $7 \leq x < 8$ | 0.7 | $-21 \leq x < -18$, $54 \leq x < 56$ | 1.5 | $0.7 \leq x < 0.8$ | 1.5 |
| $8 \leq x < 9$ | 0.6 | $8 \leq x < 9$ | 0.6 | $-24 \leq x < -21$, $56 \leq x < 58$ | 1.6 | $0.8 \leq x < 0.9$ | 1.6 |
| $9 \leq x$ | 0.5 | $9 \leq x$ | 0.5 | $x < -24$, $58 \leq x$ | 1.7 | $0.9 \leq x$ | 1.7 |

TABLE 3

Battery of Electric Vehicle

| Voltage fluctuation [V] | Co.*) | Deterioration Degree [—] | Co.*) | Average electric power consumption rate [km/kWh] | Co.*) | Charging period of time | Co.*) | Predicted drive distance [km] | Co.*) |
|---|---|---|---|---|---|---|---|---|---|
| x < 0.1 | 0.8 | 1 | 0.8 | x < 1 | 0.8 | x < 5 | 0.5 | x < 10 | 1.4 |
| 0.1 ≦ x < 0.2 | 0.9 | 0.98 ≦ x < 1 | 0.9 | 1 ≦ x < 2 | 0.85 | 5 ≦ x < 7 | 0.6 | 10 ≦ x < 20 | 1.3 |
| 0.2 ≦ x < 0.3 | 1 | 0.96 ≦ x < 0.98 | 1 | 2 ≦ x < 3 | 0.9 | 7 ≦ x < 9 | 0.7 | 20 ≦ x < 30 | 1.2 |
| 0.3 ≦ x < 0.4 | 1.1 | 0.94 ≦ x < 0.96 | 1.1 | 3 ≦ x < 4 | 0.95 | 9 ≦ x < 11 | 0.8 | 30 ≦ x < 40 | 1.1 |
| 0.4 ≦ x < 0.5 | 1.2 | 0.92 ≦ x < 0.94 | 1.2 | 4 ≦ x < 5 | 1 | 11 ≦ x < 13 | 0.9 | 40 ≦ x < 50 | 1 |
| 0.5 ≦ x < 0.6 | 1.3 | 0.9 ≦ x < 0.92 | 1.3 | 5 ≦ x < 6 | 1.05 | 13 ≦ x < 15 | 1 | 50 ≦ x < 60 | 0.9 |
| 0.6 ≦ x < 0.7 | 1.4 | 0.88 ≦ x < 0.9 | 1.4 | 6 ≦ x < 7 | 1.1 | 15 ≦ x < 17 | 1.1 | 60 ≦ x < 70 | 0.8 |
| 0.7 ≦ x < 0.8 | 1.5 | 0.86 ≦ x < 0.88 | 1.5 | 7 ≦ x < 8 | 1.15 | 17 ≦ x < 19 | 1.2 | 70 ≦ x < 80 | 0.7 |
| 0.8 ≦ x < 0.9 | 1.6 | 0.84 ≦ x < 0.86 | 1.6 | 8 ≦ x < 9 | 1.2 | 19 ≦ x < 21 | 1.3 | 80 ≦ x < 90 | 0.6 |
| 0.9 ≦ x | 1.7 | x < 0.84 | 1.7 | 9 ≦ x | 1.25 | 21 ≦ x | 1.4 | 90 ≦ x | 0.5 |

Co.*): Coefficient.

The parking space instruction means 34 detects that the adjusted residual power A' as the vehicle parameter of the on-vehicle battery 41 is present within which residual power range, and then instructs the arriving electric vehicle 4X to move to and be parked in the empty parking space 21X on the basis of the detected residual power range.

As described above, according to the parking and power charging system of the fourth embodiment, the parking space instruction means 34 can adjust the residual power of the on-vehicle battery 41 mounted on the arriving electric vehicle 4X on the basis of the performance and condition of the on-vehicle battery 41, and instructs the arriving electric vehicle 4X to move to and be parked in the optimum empty parking space 21X.

Further, the parking space instruction means 34 does not adjust the residual power of the on-vehicle battery 41 mounted on the arriving electric vehicle 4X. The parking space instruction means 34 multiplies the vehicle parameters of the arriving electric vehicle 4X with the corresponding coefficients, respectively, where the coefficients are obtained on the basis of the residual power of the on-vehicle battery 41, the maximum charging capacity of the on-vehicle battery 41, the maximum charging speed of the on-vehicle battery 41, the temperature of the on-vehicle battery 41, the internal resistance of the on-vehicle battery 41, the voltage fluctuation of the on-vehicle battery 41, the deterioration degree of the on-vehicle battery 41, the average electric-power consumption rate of the on-vehicle battery 41, the charging period of time of the on-vehicle battery 41, and the predicted drive distance of the arriving electric vehicle 4X. The parking space instruction means 34 thereby instructs the arriving electric vehicle 4X to move to and be parked in the empty parking space 21X having the optimum ranking of charging performance which is assigned by the assignment means 32 on the basis of the above multiplied value.

The other components of the parking and power charging system according to the fourth embodiment are the same of those of the parking and power charging system according to the first embodiment. The parking and power charging system according to the fourth embodiment has the same function and effects of the parking and power charging system according to the first embodiment.

ANOTHER ASPECT OF THE PRESENT INVENTION

In the parking and power charging system as another aspect of the present invention, the parking space instruction means uses the residual power of the on-vehicle battery as one of the vehicle parameters of the arriving electric vehicle. The assignment means assigns a residual power range to each of the empty parking spaces on the basis of descending order of residual power range so that the parking space with the charging device of a higher charging performance has a lower residual power range. The parking space instruction means selects one of the empty parking spaces so that the residual power of the on-vehicle battery mounted on the arriving electric vehicle is present within the residual power range assigned to the selected empty parking space, and then instructs the arriving electric vehicle to move to and be parked in the selected empty parking space.

This case uses the residual power of the on-vehicle battery as the vehicle parameter, and the parking space instruction means instructs the arriving electric vehicle to move to and be parked in the empty parking space so that the arriving electric vehicle equipped with the on-vehicle battery with a lower residual power is parked at the empty parking space equipped with the charging device of a higher charging performance. The residual power of the on-vehicle battery corresponds to the ratio between the charged quantity and the maximum charged quantity of the on-vehicle battery.

In the parking and power charging system as another aspect of the present invention, at least one of the electric vehicles and the arriving electric vehicle is an electric vehicle equipped with an on-vehicle alternator which generates electric power by receiving nature energy such as solar energy or wind force even if the electric vehicle is parked in the parking space of the car park. The communication means detects whether or not the arriving electric vehicle is an electric vehicle equipped with an on-vehicle alternator. The parking space instruction means adjusts the residual power of the on-vehicle battery of the arriving electric vehicle by adding power generation performance of the on-vehicle alternator when the arriving electric vehicle is an electric vehicle equipped with an on-vehicle alternator.

When the arriving electric vehicle is an electric vehicle equipped with an on-vehicle alternator, the parking space instruction means can select the empty parking space equipped with the charging device of a lower charging performance which corresponds to the power to be generated by the on-vehicle alternator at the parking space while the arriving electric vehicle is parked.

In the parking and power charging system as another aspect of the present invention, the parking space instruction means detects a weather condition every time the arriving electric vehicle arrives at the car park, and adjusts the power generation performance of the on-vehicle alternator of the arriving electric vehicle based on the detected weather condition.

This structure of the parking and power charging system makes it possible to adjust the residual power of the on-vehicle battery mounted on the arriving electric vehicle according to the generation power of the on-vehicle alternator of the arriving electric vehicle based of the weather condition.

In the parking and power charging system as another aspect of the present invention, the parking space instruction means uses, as the vehicle parameter, the maximum charging capacity of the on-vehicle battery mounted on the arriving electric vehicle. The assignment means assigns a range of the maximum charging capacity to each of the empty parking spaces so that the empty parking space with a higher charging performance has a higher range of the maximum charging capacity on the basis of descending order of charging performance of the charging devices.

The parking space instruction means selects one of the empty parking spaces so that the maximum charging capacity of the on-vehicle battery mounted on the arriving electric vehicle is present within the range of maximum charging capacity of the charging device mounted on the selected empty parking space, and then instructs the arriving electric vehicle to move to and be parked in the selected empty parking space.

This structure of the parking and power charging system makes it possible to instruct the arriving electric vehicle to move to and be parked in the empty parking space so that the arriving electric vehicle equipped with the on-vehicle battery having a higher charging capacity as a higher maximum charging capacity is parked in the empty parking space equipped with the charging device having a higher charging performance.

The maximum charging capacity of the on-vehicle battery indicates the maximum electric power to charge the on-vehicle battery.

In the parking and power charging system as another aspect of the present invention, the parking space instruction means uses, as the vehicle parameter, a maximum charging speed of the on-vehicle battery mounted on the arriving electric vehicle. The assignment means assigns a range of the maximum charging speed to each of the empty parking spaces so that the empty parking space equipped with the charging device having a higher charging performance has a higher range of the maximum charging speed on the basis of descending order of charging performance of the charging devices.

The parking space instruction means selects one of the empty parking spaces so that the maximum charging speed of the on-vehicle battery mounted on the arriving electric vehicle is present within the range of the maximum charging speed of the charging device mounted on the selected empty charging space, and then instructs the arriving electric vehicle to move to and be parked in the selected parking space.

This structure of the parking and power charging system makes it possible to instruct the arriving electric vehicle to move to and be parked in the empty parking space so that the arriving electric vehicle equipped with the on-vehicle battery having an easy charging function as a higher maximum charging speed is parked in the empty parking space equipped with the charging device having a higher charging speed.

The maximum charging speed of the on-vehicle battery indicates the maximum charging speed to charge the on-vehicle battery.

In the parking and power charging system as another aspect of the present invention, the parking space instruction means adjusts the residual power of the on-vehicle battery mounted on the arriving electric vehicle by considering at least one of following conditions (a) to (i): (a) a maximum charging capacity of the on-vehicle battery; (b) a maximum charging speed to charge the on-vehicle battery; (c) a temperature of the on-vehicle battery; (d) an internal resistance of the on-vehicle battery; (e) a voltage fluctuation of the on-vehicle battery; (f) a deterioration degree of the on-vehicle battery; (g) an average electric-power consumption rate which indicates the travel distance of the on-vehicle battery per electric power of the on-vehicle battery; (h) a charging period of time counted from the time when the arriving electric vehicle has just parked at the parking space to the time when the parked electric vehicle leaves this parking space; and (i) a predicted travel distance of the electric vehicle which indicates how long the electric vehicle parked in the parking space 21X travels after departing from the parking space.

This structure of the parking and power charging system makes it possible to adjust the residual power of the on-vehicle battery in consideration of the performance and the condition of the on-vehicle battery. The parking space instruction means can thereby instruct the arriving electric vehicle to move to the optimum parking space with high efficiency.

In the parking and power charging system as another aspect of the present invention, every time the arriving electric vehicle arrives at the car park, the assignment means repeatedly assigns the ranking of charging performance to each of the empty parking spaces detected by the parking state detection means and the parking space instruction means repeatedly instructs the arriving electric vehicle to move to and be parked in the selected empty parking space.

This structure of the parking and power charging system makes it possible for the management computer in the parking and power charging system to continuously and repeatedly provide the optimum parking space to the arriving electric vehicle every time the arriving electric vehicle arrives at the car park while a plurality of the electric vehicles departs from the car park.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A parking and power charging system for a car park comprising:
  a plurality of parking spaces to park electric vehicles, each of the parking spaces being equipped with a charging device having a different charging performance;
  parking state detection means configured to detect whether or not an electric vehicle is parked in each of the parking spaces every time an arriving electric vehicle arrives at the car park, and to detect empty parking spaces where no electric vehicle is parked;
  assignment means configured to assign a ranking of charging performance to each of the empty parking spaces detected by the parking state detection means so that the empty parking space with a higher charging performance has a higher ranking of charging performance on the basis of descending order of charging performance of the charging devices;

communication means configured to communicate with an on-vehicle communication unit mounted on the arriving electric vehicle in order to obtain vehicle parameters stored in the arriving electric vehicle every time the arriving electric vehicle arrives at the car park; and parking space instruction means configured to select one of the empty parking spaces using the ranking of charging performance assigned by the assignment means on the basis of the obtained vehicle parameters which indicate the residual power of the on-vehicle battery, the necessity to charge the on-vehicle battery, the charging capacity of the on-vehicle battery, and the degree to easily charge the on-vehicle battery mounted on the arriving electric vehicle, and the parking space instruction means further configured to instruct the arriving electric vehicle to move to and be parked in the selected empty parking space.

2. The parking and power charging system according to the claim 1, wherein the parking space instruction means uses the residual power of the on-vehicle battery as one of the vehicle parameters of the arriving electric vehicle, the assignment means assigns a residual power range to each of the empty parking spaces on the basis of descending order of residual power range so that the parking space with the charging device of a higher charging performance has a lower residual power range on the basis of descending order of charging performance of the charging devices, and the parking space instruction means selects one of the empty parking spaces so that the residual power of the on-vehicle battery mounted on the arriving electric vehicle is present within the residual power range assigned to the selected empty parking space, and then instructs the arriving electric vehicle to move to and be parked in the selected empty parking space.

3. The parking and power charging system according to the claim 2, wherein at least one of the electric vehicles and the arriving electric vehicle is an electric vehicle equipped with an on-vehicle alternator which generates electric power by receiving nature energy such as solar energy or wind force even if the electric vehicle is parked in the parking space of the car park, the communication means detects whether or not the arriving electric vehicle is an electric vehicle equipped with an on-vehicle alternator, and the parking space instruction means adjusts the residual power of the on-vehicle battery of the arriving electric vehicle by adding power generation performance of the on-vehicle alternator when the arriving electric vehicle is an electric vehicle equipped with an on-vehicle alternator.

4. The parking and power charging system according to the claim 3, wherein the parking space instruction means detects a weather condition every time the arriving electric vehicle arrives at the car park, and adjusts the power generation performance of the on-vehicle alternator of the arriving electric vehicle based on the detected weather condition.

5. The parking and power charging system according to the claim 1, wherein the parking space instruction means uses, as the vehicle parameter, the maximum charging capacity of the on-vehicle battery mounted on the arriving electric vehicle, the assignment means assigns a range of maximum charging capacity to each of the empty parking spaces on the basis of descending order of the charging performance of the charging device in each of the empty parking spaces so that the empty parking space with a higher charging performance has a higher range of the maximum charging capacity, and the parking space instruction means selects one of the empty parking spaces so that the maximum charging capacity of the on-vehicle battery mounted on the arriving electric vehicle is present within the range of maximum charging capacity of the selected empty parking space, and then instructs the arriving electric vehicle to move to and be parked in the selected empty parking space.

6. The parking and power charging system according to the claim 1, wherein the parking space instruction means uses, as the vehicle parameter, a maximum charging speed of the on-vehicle battery mounted on the arriving electric vehicle, the assignment means assigns a range of the maximum charging speed to each of the empty parking spaces so that the empty parking space with a higher charging performance has a higher range of the maximum charging speed on the basis of descending order of charging performance of the charging devices, and the parking space instruction means selects one of the empty parking spaces so that the maximum charging speed of the on-vehicle battery mounted on the arriving electric vehicle is present within the range of the maximum charging speed of the selected empty charging space, and then instructs the arriving electric vehicle to move to and be parked in the selected parking space.

7. The parking and power charging system according to the claim 2, wherein the parking space instruction means adjusts the residual power of the on-vehicle battery mounted on the arriving electric vehicle by considering at least one of following conditions (a) to (i):

(a) a maximum charging capacity of the on-vehicle battery;
(b) a maximum charging speed to charge the on-vehicle battery;
(c) a temperature of the on-vehicle battery;
(d) an internal resistance of the on-vehicle battery;
(e) a voltage fluctuation of the on-vehicle battery;
(f) a deterioration degree of the on-vehicle battery;
(g) an average electric-power consumption rate which indicates the travel distance of the on-vehicle battery per electric power of the on-vehicle battery;
(h) a charging period of time counted from the time when the arriving electric vehicle has just parked at the parking space to the time when the parked electric vehicle leaves this parking space; and
(i) a predicted travel distance of the electric vehicle which indicates how long the electric vehicle parked in the parking space 21X travels after departing from the parking space.

8. The parking and power charging system according to the claim 2, wherein every time the arriving electric vehicle arrives at the car park, the assignment means repeatedly assigns the ranking of charging performance to each of the empty parking spaces detected by the parking state detection means and the parking space instruction means repeatedly instructs the arriving electric vehicle to move to and be parked in the selected empty parking space.

* * * * *